(12) United States Patent
Sekine et al.

(10) Patent No.: US 7,703,329 B2
(45) Date of Patent: Apr. 27, 2010

(54) PRESSURE SENSOR

(75) Inventors: Masashi Sekine, Tokyo (JP); Hidefumi Harada, Tokyo (JP)

(73) Assignee: Yamatake Corporation (JP)

( * ) Notice: Subject to any disclaimer, the term of this patent is extended or adjusted under 35 U.S.C. 154(b) by 113 days.

(21) Appl. No.: 11/630,015

(22) PCT Filed: Jun. 13, 2005

(86) PCT No.: PCT/JP2005/010799
§ 371 (c)(1),
(2), (4) Date: Jan. 25, 2007

(87) PCT Pub. No.: WO2005/124307

PCT Pub. Date: Dec. 29, 2005

(65) Prior Publication Data
US 2008/0245154 A1    Oct. 9, 2008

(30) Foreign Application Priority Data
Jun. 17, 2004   (JP) .............................. 2004-180267

(51) Int. Cl.
*G01L 9/00* (2006.01)
(52) U.S. Cl. .......................................... 73/754; 73/756
(58) Field of Classification Search ............ 73/700–756
See application file for complete search history.

(56) References Cited

U.S. PATENT DOCUMENTS

| | | | | |
|---|---|---|---|---|
| 4,838,088 A | * | 6/1989 | Murakami | .................... 73/724 |
| 6,176,137 B1 | * | 1/2001 | Sasaki et al. | .................. 73/754 |
| 7,210,357 B2 | * | 5/2007 | Tanaka et al. | ................. 73/754 |
| 2005/0087020 A1 | * | 4/2005 | Ueyanagi et al. | .............. 73/753 |
| 2006/0107750 A1 | * | 5/2006 | Tanaka et al. | ................. 73/754 |
| 2006/0213276 A1 | * | 9/2006 | Ueyanagi et al. | .............. 73/754 |
| 2008/0072680 A1 | * | 3/2008 | Matsui et al. | ................. 73/723 |

FOREIGN PATENT DOCUMENTS

| | | |
|---|---|---|
| CN | 1466780 | 1/2004 |
| JP | 11-149969 | 6/1999 |
| JP | 2000-171315 | 6/2000 |
| JP | 2001-330529 | 11/2001 |

OTHER PUBLICATIONS

International Search Report for International Application No. PCT/JP2005/010799 dated Jul. 12, 2005.
Chinese Office Action for Chinese Application No. 200580019682 mailed Mar. 7, 2008.

* cited by examiner

*Primary Examiner*—Andre J Allen
(74) *Attorney, Agent, or Firm*—Cantor Colburn LLP

(57) ABSTRACT

There is provided a pressure sensor having: a sensor chip (30) which detects a pressure; a base plate (20 (21, 22)) which supports the sensor chip (30); and a support diaphragm (50) which is bonded to the base plate (20 (21, 22)) and supports the base plate (20 (21, 22)), wherein the pressure sensor (1) has a structure in which the support diaphragm (50) is joined to a package (10), and the sensor chip (30) and the base plate (20 (21, 22)) are supported in the package through the support diaphragm (50) alone, thereby constantly and accurately detecting a pressure without being affected by a heat stress caused due to heat from the outside.

12 Claims, 1 Drawing Sheet

PRESSURE SENSOR

CROSS REFERENCE TO RELATED APPLICATIONS

This is a U.S. national stage of application No. PCT/JP2005/010799, filed on 13 Jun. 2005. Priority under 35 U.S.C. §119(a) and 35 U.S.C. §365(b) is claimed from Japanese Application No. 2004-180267, filed 17 Jun. 2004, the disclosure of which is also incorporated herein by reference.

TECHNICAL FIELD

The present invention relates to a pressure sensor provided with a diaphragm structure which detects, e.g., an electric capacitance corresponding to a measurement target pressure as a pressure, and more particularly to a pressure sensor suitable for measuring a pressure close to a vacuum.

BACKGROUND ART

A pressure sensor provided with a diaphragm structure which detects a change in measurement target pressure as a change in electric capacitance has been conventionally widely known. As an example of this pressure sensor, there is a pressure sensor in which a movable plate is joined near a strain generating region on a vacuum chamber side of a diaphragm and a movable electrode and a fixed electrode are respectively formed on opposed surfaces of an outer peripheral portion of the movable plate and a fixed portion of the diaphragm to detect a change in electric capacitance between these electrodes as a change in pressure (see, e.g., Japanese Patent Application Laid-open No. 2002-267559 as Patent Document 1).

Further, there is also considered a pressure sensor having a structure in which a sensor chip is supported in a metal frame body of a package through a metal plate, a cover plate and a buffer member to securely support the sensor chip in the package and the cover plate is held and constrained between the metal plate and a base.

Patent Document 1: Japanese Patent Application Laid-open No. 2002-267559

DISCLOSURE OF INVENTION

Problem to be Solved by the Invention

On the other hand, in a highly accurate pressure sensor which measures a small pressure like a vacuum gauge in particular, there is an inherent problem to be solved in regard to fixing a pressure sensor element (a sensor chip) to a package. Specifically, this is a problem that since the pressure sensor itself has a high accuracy, a heat stress caused due to a change in temperature of the package or a fixing material is transmitted to the sensor element fixed to the package, and the sensor element detects this heat stress, thereby producing a measurement error.

In order to solve this problem, there can be considered a countermeasure which separates the package from the sensor element and a material having linear expansion coefficient which is an intermediate values of these members is held between them to alleviate a stress. However, since respective constituent elements are bonded in a superimposed state, a stress is still transmitted between rigid bodies because of the structure, and an influence of a heat stress can be alleviated to some extent, but an influence of such a heat stress is given in measurement of a small pressure, thus resulting in a measurement error.

In particular, when a pressure sensor for measurement of a small pressure is used in a semiconductor manufacturing process, a pressure of a process gas with a high temperature which is close to a vacuum must be measured. Therefore, it is impossible to eliminate a problem of a function of a heat stress caused due to a difference in thermal expansion coefficient between a package of the pressure sensor and each constituent element accommodated in this package.

On the other hand, there can be also considered a countermeasure of adopting a structure in which the sensor element is greatly separated from the package to reduce an influence of such a heat stress. Specifically, this is a structure in which a pedestal consisting of, e.g., Pyrex (registered trademark) glass is provided in the package and a sensor chip is arranged on an upper surface of the pedestal with a certain degree of distance from the package. However, such a structure increases the entire pressure sensor in size, which is against a demand for a reduction in size of the pressure sensor itself.

It is an object of the present invention to provide a pressure sensor which is hardly affected by a heat stress caused due to heat from the outside and can constantly perform pressure detection with a high accuracy.

Means for Solving Problem

To achieve this object, a pressure sensor according to the present invention has a sensor chip which detects a pressure, a base plate which supports the sensor chip and a support diaphragm which is bonded to the base plate and supports the base plate, and is characterized in that a part of the support diaphragm is joined to a package, and the sensor chip and the base plate are supported in the package through the support diaphragm alone.

In an internal space of the package, the sensor chip and the base plate are supported through the support diaphragm alone so as not to directly come into contact with an inner wall of the package. As a result, a heat stress caused due to a precipitous thermal change acting on the pressure sensor itself can be alleviated with flexibility corresponding to a heat stress of the support diaphragm. As a result, a measurement accuracy is hardly reduced by an influence of heat applied to the pressure sensor.

Further, the pressure sensor according to claim 2 of the present invention is, in the pressure sensor according to claim 1, characterized in that the base plate is formed of a first base plate and a second base plate consisting of the same material, and the support diaphragm is bonded in a state where it is held between the first base plate and the second base plate.

With the support diaphragm and the base plate being bonded in a so-called sandwich form, occurrence of a heat stress is alleviated by a bimetal effect and an influence of heat applied to the pressure sensor is eliminated so that a measurement accuracy is hardly lowered.

Furthermore, the pressure sensor according to claim 3 of the present invention is, in the pressure sensor according to claim 1 or claim 2, characterized in that a contact pad which is connected with an electrode portion of the sensor chip to achieve electrical conduction is formed on the sensor chip, the package is provided with an electrode lead, and the contact pad and the electrode lead are in contact with each other to attain electrical conduction through an elastic body having flexibility for protection of the sensor chip.

Even if the support diaphragm is displaced when a heat stress is produced due to a difference in linear expansion coefficient between the package and the support diaphragm or when a pressure applied to the pressure sensor is precipitously increased, the elastic body having conduction properties which is interposed between the electrode lead and the contact pad is sufficiently bent so that an excessive pressure is not applied to the sensor chip, and hence a measurement accuracy is not adversely affected.

Moreover, the pressure sensor according to claim 4 of the present invention is, in the pressure sensor according to claim 2, characterized in that the support diaphragm is formed of a thin plate consisting of Inconel, and the first base plate and the second base plate are sufficiently thick with respect to a thickness of the support diaphragm and formed of sapphire.

Adopting such a structure prevents the support diaphragm and the base plate from warping due to a heat stress caused owing to a difference in thermal expansion coefficient between these portions.

It is preferable in the pressure sensor according to claim 4 that the sensor chip is formed of sapphire and bonded through an aluminum oxide base bonding material which changes into the same material as that of the base plate after bonded to the base plate which supports the sensor chip.

Additionally, it is preferable in the pressure sensor according to claim 1 that the sensor chip has a spacer formed of a thin plate, a sensor diaphragm which is bonded to the spacer and strained in accordance with application of a pressure, and a sensor pedestal which is bonded to the sensor diaphragm to form a vacuum reference chamber.

Further, it is preferable in the pressure sensor according to claim 6 that the spacer, the sensor diaphragm and the sensor pedestal are directly bonded to each other by means of direct bonding to constitute the integrated sensor chip.

Furthermore, it is preferable in the pressure sensor according to claim 3 that the electrode lead portion includes an electrode lead pin and a metallic shield, the electrode lead pin is embedded in the central part of the metallic shield through a hermetic sealing to maintain an air-tight state between both end portions of the electrode lead pin and the hermetic sealing is also interposed between the shield and the package.

Moreover, it is preferable in the pressure sensor according to claim 3 that the elastic body is constituted of a contact spring having electrical conductivity.

Additionally, it is preferable in the pressure sensor according to claim 9 that the contact spring is constituted of a coil spring or a leaf spring having electrical conductivity.

It is to be noted that, in the pressure sensor according to claim 3, the elastic body may be formed of an electroconductive wire having sufficient flexibility.

Further, in the pressure sensor according to claim 1, the support diaphragm may be formed of any of stainless or Kovar.

Furthermore, in the pressure sensor according to claim 1, the base plate and the sensor chip may be formed of one in a group consisting of silicon, alumina, silicon carbide and quartz.

BEST MODES FOR CARRYING OUT THE INVENTION

Figure 1:
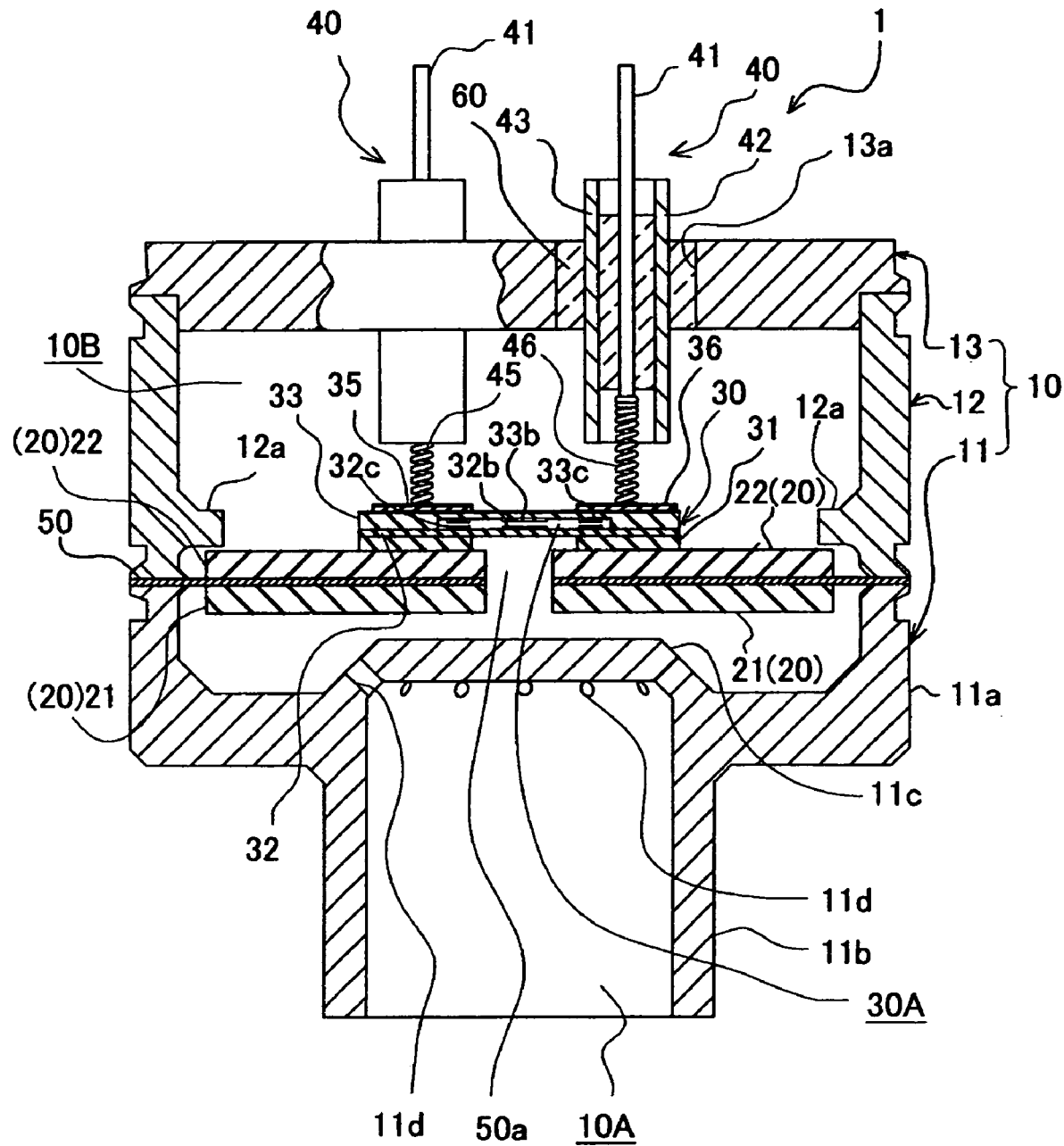
FIG. 1 is a cross-sectional view of a pressure sensor according to an embodiment of the present invention.

A pressure sensor according to an embodiment of the present invention will now be described hereinafter with reference to the accompanying drawing.

As shown in FIG. 1, a pressure sensor 1 according to an embodiment of the present invention includes a package 10, a base plate 20 accommodated in the package, a sensor chip 30 which is likewise accommodated in the package and bonded to the base plate 20, and an electrode lead portion 40 which is directly disposed to the package 10 and connects the inside and outside of the package to achieve electrical conduction. Moreover, the base plate 20 is separated from the package 10, and supported by the package 10 through a support diaphragm 50 alone.

The package 10 is constituted of a lower housing 11, an upper housing 12 and a cover 13. It is to be noted that the lower housing 11, the upper housing 12 and the cover 13 consist of Inconel which is an anticorrosion metal and are respectively joined to each other through welding.

The lower housing, 11 is provided with a shape obtained by coupling cylindrical bodies having different diameters, a large-diameter portion 11a thereof has a junction with respect to the support diaphragm 50, and a small-diameter portion 11b thereof forms a pressure introducing portion 10A into which a measurement target fluid flows. It is to be noted that a baffle 11c is formed at a coupling part between the large-diameter portion 11a and the small-diameter portion 11b and pressure introducing holes 11d are formed at the periphery of the buffer 11c at predetermined intervals in a circumferential direction.

The baffle 11c functions to divert a measurement target fluid such as a process gas from the pressure introducing portion 10A without directly reaching a later-described sensor chip 30, and prevents a component of the process gas or an impurity in the process gas from being deposited in the sensor chip 30.

The upper housing 12 has a substantially cylindrical shape, and forms a reference vacuum chamber 10B which has a vacuum inside the package and is independent from a region where the process gas is introduced in the package through the later-described cover 13, the support diaphragm 50, the base plate 20 and the sensor chip 30. It is to be noted that a sealed space B includes a gas absorption material which is a so-called getter (not shown), thereby maintaining a degree of vacuum.

Additionally, a stopper 12a is formed to protrude at an appropriate position in the circumferential direction on the support diaphragm attachment side of the upper housing 12. It is to be noted that this stopper 12a serves to restrict the base plate 20 from excessively displacing due to a precipitous increase in pressure of the measurement target fluid.

Further, the cover 13 is formed of a circular plate, an electrode lead insertion hole 13a is formed at a predetermined position of the cover 13, and an electrode lead portion 40 is embedded through a hermetic sealing 60, thus assuring sealing properties of this part.

On the other hand, the support diaphragm 50 is formed of a thin plate of Inconel having an outer shape matching with a shape of the casing 10, and its peripheral edge portion is held between edge portions of the upper housing 11 and the lower housing 12 and joined through welding or the like. It is to be noted that a thickness of the support diaphragm 50 is, e.g., several-ten microns in this embodiment, and it is a thickness which is sufficiently smaller than those of respective base plates 21 and 22. Furthermore, a pressure introducing hole 50a through which a pressure is introduced to the sensor chip 30 is formed at a central part of the support diaphragm 50.

A lower base plate (a first base plate) 21 and an upper base plate (a second base plate) 22 each of which has a thin ring-like shape consisting of sapphire as a single-crystal body of aluminum oxide are bonded to both surfaces of the support diaphragm 50 at a position separated from the junction of the support diaphragm 50 and the casing 10 to some extent in the entire circumferential direction.

It is to be noted that the base plates 21 and 22 have a thickness sufficiently larger than that of the support diaphragm 50 as described above, and have a structure in which the support diaphragm 50 is held between both the base plates 21 and 22 in a so-called sandwich form. As a result, the support diaphragm 50 and the base plate 20 are prevented from warping by a heat stress generated due to a difference in thermal expansion coefficient between these portions.

Further, the sensor chip 30 which is formed of sapphire as a single-crystal body of aluminum oxide and has a rectangular shape as seen from the upper surface is bonded to the upper base plate 22 through an aluminum oxide base bonding material which changes into the same material as that of a spacer 31 and the upper base plate 22 after bonding. It is to be noted that this bonding method is described in Japanese Patent Application Laid-open No. 2002-111011 in detail. The sensor chip 30 has a size which is not greater than 1 square centimeter seen from the upper surface, and has the spacer 31 formed of a square thin plate, a sensor diaphragm 32 which is bonded to the spacer 31 and in which a strain is generated in accordance with application of a pressure, and a sensor pedestal 33 which is bonded to the sensor diaphragm 32 to form a vacuum capacitance chamber (a reference chamber) 30A. Furthermore, both the vacuum capacitance chamber 30A and the reference vacuum chamber 10B maintain the same degree of vacuum through a non-illustrated communication hole formed at an appropriate position of the sensor pedestal 33.

It is to be noted that the spacer 31, the sensor diaphragm 32 and the sensor pedestal 33 are bonded to each other through so-called direct bonding to constitute the integrated sensor chip 30.

Moreover, in the capacitance chamber 30A of the sensor chip 30, fixed electrodes 33b and 33c each of which consists of a conductor of, e.g., gold or platinum are formed in a concave portion 33a of the sensor pedestal 33, and movable electrodes 32b and 32c each of each of which consists of a conductor of, e.g., gold or platinum are formed on a surface of the sensor diaphragm 32 facing the fixed electrodes. Additionally, contact pads 35 and 36 formed of gold or platinum are formed on an upper surface of the sensor chip 30, and these fixed electrodes 33b and 33c and movable electrodes 32b and 32c are connected with the contact pads 35 and 36 through non-illustrated wiring lines.

On the other hand, the electrode lead portion 40 includes an electrode lead pin 41 and a metallic shield 42, and the electrode lead pin 41 is embedded in the central part of the metallic shield 42 with a hermetic sealing 43 consisting of an insulative material such as glass, thereby maintaining an airtight state between both end portions of the electrode lead pin 41. Further, one end of the electrode lead pin 41 is exposed to the outside of the package 10 to transmit an output from the pressure sensor 1 to an external signal processing portion through a non-illustrated wiring line. It is to be noted that a hermetic sealing 60 is also interposed between the shield 42 and the cover 13 as mentioned above. Furthermore, contact springs 45 and 46 having electrical conductivity are connected with the other end portion of the electrode lead pin 41.

The contact springs 45 and 46 have sufficient flexibility that prevents biasing forces of the contact springs 45 and 46 from affecting a measurement accuracy of the sensor chip 30 even if the support diaphragm 50 is slightly displaced by a precipitous increase in pressure caused when a measurement target fluid such as a process gas suddenly flows in from the pressure introducing portion 10A.

A function of the pressure sensor 1 having such a configuration will now be described. It is to be noted that, in this embodiment, the pressure sensor 1 is disposed at an appropriate position in, e.g., a semiconductor manufacturing apparatus and a small pressure of a process gas close to a vacuum (which will be referred to as a "micro-pressure" hereinafter) is measured in a semiconductor manufacturing process such as CVD (Chemical Vapor Deposition).

The process gas flows into the package from the pressure introducing portion 10A of the pressure sensor 1 through the pressure introducing hole 11d. At this time, even if sudden inflow of the process gas occurs, the process gas is diverted to flow into the package through the baffle 11c and the pressure introducing hole 11d, and hence the process gas does not directly apply to the sensor diaphragm 32. Therefore, it is possible to prevent a component of the process gas or an impurity contained in the process gas from being re-deposited on the sensor diaphragm 32.

It is to be noted that, even if the process gas has a micro-pressure, since the capacitance chamber of the sensor chip 30 has a vacuum, the sensor diaphragm 32 is bent so that a gap between the fixed electrodes 33b and 33c and the movable electrodes 32b and 32c changes. As a result, a capacitance value of a capacitor constituted of the fixed electrodes 33b and 33c and the movable electrodes 32b and 32c varies. When this change in capacitance value is taken to the outside of the pressure sensor 1 by using the electrode lead portion 40, a micro-pressure of the process gas can be measured.

On the other hand, in this embodiment, since the pressure sensor 1 is installed in the semiconductor manufacturing process and the process gas has a high temperature, a large thermal change occurs in the part at which the pressure sensor 1 is disposed before and after inflow of the process gas to the semiconductor manufacturing apparatus. Further, since the sensor itself is also heated and then used, a thermal change occurs.

Here, the package 10 is formed of a metal and the base plate 20 and the sensor chip 30 is formed of sapphire, these members have different thermal expansion coefficients. Therefore, when a surface of the package is in contact with that of the base plate like a conventional example, a difference in thermal expansion coefficient between the respective members functions as a heat stress through this contact region, and this heat stress is transmitted to the sensor chip included in the base plate, thereby adversely affecting accurate measurement of a micro-pressure.

However, in case of the pressure sensor 1 in this embodiment, the base plate 20 and the package 10 are supported through the support diaphragm 50 alone which has a small thickness, and the base plate 20 is not directly in contact with the package 10. Therefore, even if the base plate 20 and the package 10 have the above-described difference in degree of thermal expansion due to a difference in material, the thin support diaphragm 50 is deformed, e.g., expanded or bent in a region sandwiched between the package 10 and the base plate 20 so that a heat stress is hardly transmitted to the junction between the base plate 20 and the sensor chip 30. Therefore, even if a precipitous thermal change occurs in the pressure sensor 1, a heat stress caused due to this thermal change is hardly produced in the sensor chip 30.

Furthermore, the base plate 20 has a large thickness, and the support diaphragm 50 has a thickness which is sufficiently smaller than that of the base plate 20. Moreover, the support diaphragm 50 is held between the lower base plate 21 and the upper base plate 20 in the sandwich structure. As a result, even if there is a difference in thermal expansion coefficient between the members like the base plate 20 formed of, e.g., sapphire and the support diaphragm 50 formed of, e.g., stainless, both the members do not warp like a so-called bimetal.

Therefore, it is possible to likewise suppress occurrence of a heat stress which adversely affects the sensor chip 30 in this part.

Additionally, the contact pads 35 and 36 are formed on the sensor chip 30, and the contact springs 45 and 46 having sufficient flexibility are in contact with these contact pads 35 and 36 to achieve electrical conduction. Further, as to flexibility of the contact springs 45 and 46, these members are sufficiently flexible so that biasing forces of the contact springs 45 and 46 do not affect detection sensitivity of the sensor chip 30 even if the support diaphragm 50 is deformed and the sensor chip 30 is slightly moved due to a sudden increase in pressure of the process gas or a thermal change in the entire pressure sensor. Therefore, the contact springs 45 and 46 do not adversely affect pressure detection of the sensor chip 30 in response to a sudden thermal change in the pressure sensor 1.

It is to be noted that the package 10 or the support diaphragm 50 is formed of Inconel in the foregoing embodiment, but it is not restricted thereto, and it may be formed of an anticorrosion metal such as stainless or Kovar.

Moreover, the base plate 20 or the sensor chip 30 is formed of the sapphire, but it is not restricted to this material, and it may be formed of silicon, alumina, silicon carbide or quartz.

Additionally, although the connecting portions between the contact pads 35 and 36 and the electrode lead portion 40 are constituted as so-called contact springs 45 and 46, they are not necessarily restricted thereto as long as they have sufficient flexibility mentioned above, and they may have a conformation like a leaf spring. Further, the electrode lead portion 40 may be connected with each of the contact pads 35 and 36 through a sufficiently flexible electroconductive wire.

Incidentally, it is not necessarily required to provide the baffle 11c in the pressure introducing portion 10A like this embodiment, but provision of the baffle 11 is most effective for prevention of deposition of a gas component or an impurity on the sensor diaphragm 32 which is involved by sudden inflow of the process gas.

Furthermore, the support diaphragm 50 does not have to be necessary held between both the lower base plate 21 and the upper base plate 22 in the sandwich form like this embodiment. That is, reducing the thickness of the support diaphragm 50 to be sufficiently smaller than that of each of the base plates 21 and 22 can prevent occurrence of warpage like a so-called bimetal even if a sudden thermal change is produced in the pressure sensor 1 when the base plate is bonded to, e.g., one surface alone of the support diaphragm 50, and hence a heat stress which affects detection characteristics of the sensor chip 30 is hardly generated.

However, with both sides of the support diaphragm 50 being held between the respective base plates 21 and 22 in the sandwich structure like this embodiment, the two base plates 21 and 22 are bonded to the support diaphragm 50 to form a symmetrical shape through the support diaphragm 50, and warp due to a heat stress generated in the support diaphragm 50 and the respective base plates 21 and 22 can be thereby suppressed, thus more effectively avoiding occurrence of the heat stress due to a difference in thermal expansion coefficient between the support diaphragm 50 and the base plate 20.

The present inventor actually confirmed that a remaining stress in the junction can be alleviated in a case where the base plates are bonded to both surfaces of the support diaphragm as compared with a case where the support diaphragm is bonded to one surface alone of the support diaphragm.

It is to be noted that the above has described the example where the capacitance type sensor chip is used in the foregoing embodiment, but providing the above-mentioned structure can effectively prevent a heat stress produced by application of heat to the pressure sensor from being transmitted to the sensor chip even in the pressure sensor including a piezoresistance type sensor chip formed of, e.g., silicon in place of this sensor chip, thereby enabling highly accurate measurement of a pressure.

Further, it is needless to say that the shapes of the sensor chip 30, the base plate 20, the electrode lead portion 40, and the casing 10 are not restricted to those in the foregoing embodiment.

As described above, in the pressure sensor 1 according to the present invention, the base plate 20 including the sensor chip 30 is connected with the package 10 through the thin support diaphragm 50 alone. That is, the sensor chip 30 and the base plate 20 are supported in the package through the support diaphragm 50 alone in the space of the package 10 in such a manner that these members do not directly come into contact with the inner wall of the package 10. As a result, a heat stress caused due to a sudden thermal change applied to the pressure sensor itself can be alleviated by flexibility with respect to the heat stress of the support diaphragm 50. Moreover, in this case, when the support diaphragm 50 and the base plate 20 are bonded in a so-called sandwich form, occurrence of the heat stress can be further alleviated by a bimetal effect.

Additionally, the electrodes are provided in the package 10, the contact pads 35 and 36 connected with the electrodes to achieve electrical conduction are formed on the upper surface of the sensor chip, and the electrode lead portion 40 is in contact with the contact pads 35 and 36 to attain electrical conduction through the contact springs 45 and 46 having sufficient flexibility. As a result, even if a heat stress due to a difference in thermal expansion coefficient between the package 10 and the support diaphragm 50 occurs, this part does not adversely affect the sensor chip 30 based on this occurrence.

On the other hand, when the pressure sensor 1 is used as a vacuum gauge, there is a problem that a contaminated particle from a measurement atmosphere or a gas component in the measurement atmosphere adheres to the sensor diaphragm to adversely affect bending of the sensor diaphragm, which results in an error. However, in the pressure sensor 1 according to the present invention, such a contaminated particle or a gas component is scattered toward the support diaphragm side by the baffle 11c, and hence it is possible to reduce an adverse affect in measurement of a pressure by deposition of a gas component on the sensor chip 30 or adhesion of a contaminated material to the same.

As described above, according to the present invention, it is possible to obtain the pressure sensor which is hardly affected by a heat stress caused due to heat from the outside and can constantly perform pressure detection with a high accuracy.

The invention claimed is:

1. A pressure sensor comprising:
   a sensor chip which detects a pressure;
   a base plate which supports the sensor chip; and
   a support diaphragm which is bonded to the base plate and supports the base plate;
   wherein a part of the support diaphragm is joined to the package, and the sensor chip and the base plate are supported in the package through the support diaphragm; and
   wherein the base plate consists of a first base plate and a second base plate which are formed of the same material, and the support diaphragm is bonded in a state where it is held between the first base plate and the second base plate.

2. The pressure sensor according to claim 1, wherein a contact pad connected with an electrode portion of the sensor chip to achieve electrical conduction is formed on the sensor chip, the package includes an electrode lead, and the contact pad is in contact with the electrode lead to attain electrical conduction through an elastic body.

3. The pressure sensor according to claim 1, wherein the support diaphragm is formed of a thin plate consisting of Inconel, and the first base plate and the second base plate are formed of sapphire.

4. The pressure sensor according to claim 3, wherein the sensor chip is formed of sapphire and bonded to the base plate supporting the sensor chip through an aluminum oxide base bonding material which changes into the same material as that of the base plate after bonding.

5. The pressure sensor according to claim 1, wherein the sensor chip has a spacer formed of a thin plate, a sensor diaphragm which is bonded to the spacer and strained in accordance with application of a pressure, and a sensor pedestal which is bonded to the sensor diaphragm to form a vacuum reference chamber.

6. The pressure sensor according to claim 5, wherein the spacer, the sensor diaphragm, and the sensor pedestal are bonded to each other by means of direct bonding to constitute the integrated sensor chip.

7. The pressure sensor according to claim 2, wherein the electrode lead portion includes an electrode lead pin and a metallic shield, the electrode lead pin is embedded in the central part of the metallic shield through a hermetic sealing to maintain an air-tight state between both end portions of the electrode lead pin, and the hermetic sealing is also interposed between the shield and the package.

8. The pressure sensor according to claim 2, wherein the elastic body is constituted of a contact spring having electrical conductivity.

9. The pressure sensor according to claim 8, wherein the contact spring is constituted of a coil spring or a leaf spring having electrical conductivity.

10. The pressure sensor according to claim 2, wherein the elastic body is constituted of an electro conductive wire having sufficient flexibility.

11. The pressure sensor according to claim 1, wherein the support diaphragm is formed of any of stainless or Kovar.

12. The pressure sensor according to claim 1, wherein the first base plate, the second base plate, and the sensor chip are formed of one in a group consisting of silicon, alumina, silicon carbide and quartz.

* * * * *